(12) United States Patent
Ikeda

(10) Patent No.: US 6,512,585 B1
(45) Date of Patent: Jan. 28, 2003

(54) LASER SCANNING POSITION DETECTING DEVICE

(75) Inventor: Teruyuki Ikeda, Niigata (JP)

(73) Assignee: Murata Manufacturing Co. Ltd ( * ) Notice: Subject to any disclaimer, the term of this patent is extended or adjusted under 35 U.S.C. 154(b) by 0 days.

(21) Appl. No.: 09/487,001

(22) Filed: Jan. 19, 2000

(30) Foreign Application Priority Data

Jan. 20, 1999 (JP) ............................................ 11-011930

(51) Int. Cl.[7] .............................................. G01N 21/88
(52) U.S. Cl. ...................................... 356/431; 356/615
(58) Field of Search ................................ 356/429, 430, 356/431, 615

(56) References Cited

U.S. PATENT DOCUMENTS 4,823,014 A * 4/1989 Miyawaki ................... 250/561
5,644,141 A * 7/1997 Hooker et al. ........... 250/559.22
5,844,591 A * 12/1998 Takamatsu et al. .......... 347/235
5,982,402 A * 11/1999 Yoshikawa et al. .......... 347/116
6,118,570 A * 9/2000 Kanai et al. ................. 359/210

FOREIGN PATENT DOCUMENTS

JP 4-163515 6/1992
JP 5-119572 5/1993

* cited by examiner

Primary Examiner—Richard A. Rosenberger
(74) Attorney, Agent, or Firm—Dickstein, Shapiro, Morin & Oshinsky, LLP.

(57) ABSTRACT

A scanning position detecting device which allows detection of the scanning position of a laser beam scanning at high speed is disclosed. A position sensitive detector is provided to detect the scanning position of a laser beam when the laser beam passes through the device. A lens is provided to direct the laser beam to a predetermined point of the position sensitive detector to form the beam spot for a predetermined time period during which the laser beam is scanning the device.

12 Claims, 6 Drawing Sheets

LASER SCANNING POSITION DETECTING DEVICE

BACKGROUND OF THE INVENTION

1. Field of the Invention

The present invention relates to a laser scanning position detecting device for detecting the scanning position of a scanning laser beam supplied from a laser unit, which is used in a laser printer to expose an electrostatic latent image forming member such as a photosensitive material drum of a photosensitive material belt.

2. Description of the Related Art

A laser printer of tandem type has been known. In this type of laser printer, exposure optical systems (laser units) corresponding to four printing colors, i.e., yellow (Y), magenta (M), cyan (C), and black (Bk), are disposed in parallel to the rotation direction of the photosensitive material belt having an electrostatic latent image formed thereon. By operating these exposure optical systems in synchronism with the rotating movement of the photosensitive material belt, an image (an electrostatic latent image) is formed on the photosensitive material.

Figure 1:
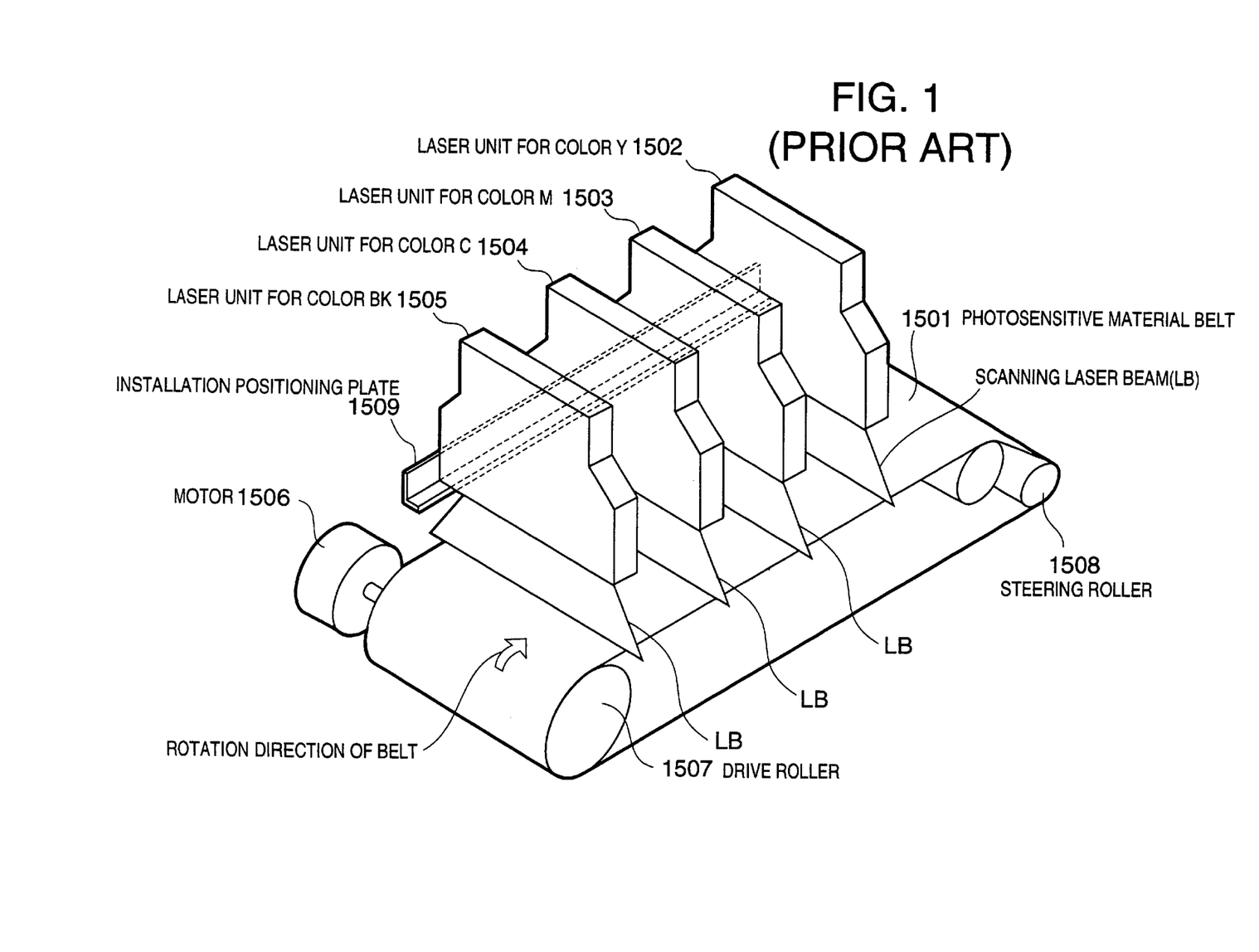
FIG. 1 is a schematic configuration diagram showing an image forming unit of a conventional tandem printer having a photosensitive material belt and four laser units.

FIG. 1 is a schematic configuration diagram showing an image forming section of a conventional laser printer of tandem type having a photosensitive material belt and four laser units. In the printer shown in FIG. 1, however, illustration of a developer is omitted.

The laser printer of tandem type shown in FIG. 1 includes a photosensitive material belt 1501 formed of a belt-shaped photosensitive material on which an electrostatic latent image is formed, and four laser units corresponding to four printing colors (a laser unit 1502 for the Y color, a laser unit 1503 for the M color, a laser unit 1504 for the C color, and a laser unit 1505 for the Bk color). Four laser units are disposed in a line along a rotation direction of the photosensitive material belt 1501.

The photosensitive material belt 1501 is wound around a drive roller 1507 and a steering roller 1508. The photosensitive material belt 1501 is adapted to be rotated when rotating drive force of a motor 1506 is transmitted to the drive roller 1507 via a transmission system such as gears which are not illustrated. The steering roller 1500 is provided to prevent the photosensitive material belt 1501 from meandering. As a result, the equilibrium state of the photosensitive material belt 1501 is maintained.

In the tandem-type printer having such a configuration, mounting precision of the laser units for forming respective colors is important. In the tandem-type printer, therefore, an L-shaped installation positioning plate 1509 is provided as a means for mounting the laser units for respective colors with high precision. Hereafter, an alignment process of laser units using an installation positioning plate 1509 will be described.

Typically, in each laser unit, there is an SOS (Start of Scan) sensor which serves as an image writing start reference and which is not illustrated. By taking a signal output of this SOS sensor as a reference, image forming timing is derived. The SOS sensors in respective laser units are adjusted so as to have the same image forming timing at predetermined installation positions of the respective laser units. When the laser units for respective colors are fixed on the same installation positioning plate 1509, therefore, positions of respective laser units are adjusted by using an adjustment mechanism while measuring the intervals between the laser units in the installation positioning plate 1509 side and the intervals between the laser units in a side opposite to the installation positioning plate 1509. As a result, the mounting precision of respective laser units is ensured, and alignment of respective laser units is conducted.

However, the laser units can be aligned by using the above described means only in the case where the laser units are disposed so as to be parallel to each other as in the printer shown in FIG. 1.

Figure 2:
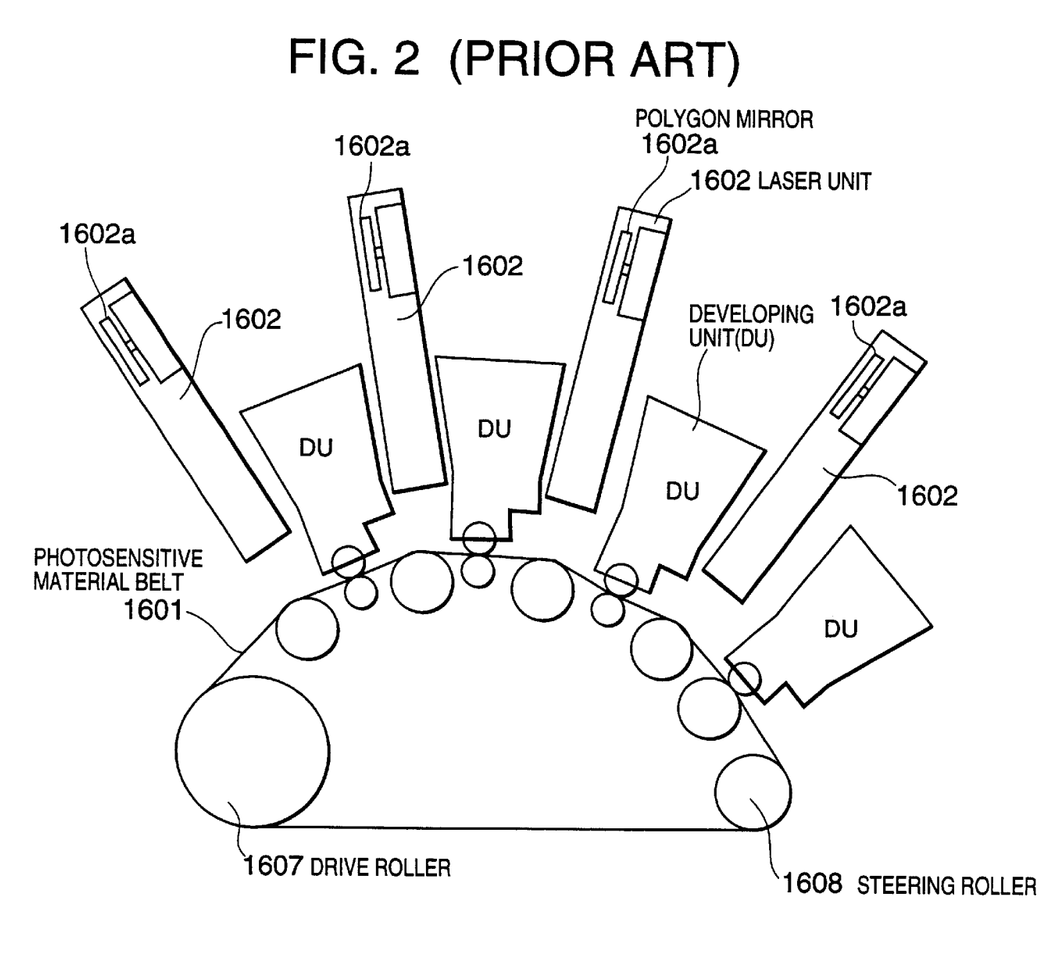
FIG. 2 is a schematic configuration diagram showing an image forming unit of another conventional tandem printer having a photosensitive material belt and four laser units.

As shown in FIG. 2, however, in the case where it is necessary to swell an exposed surface of a photosensitive material belt 1601 in an arch form from restrictions concerning the reduction in apparatus size and the configuration of a developer, the laser units 1602 cannot be mounted so as to become parallel to each other. In this case, it is difficult to accurately measure the mounting error between the laser units as described above. Even when the mounting error can be measured, differing mounting angles of the laser units cause different positions of laser beam scan lines of the laser units 1602 with respect to the vertical direction, due to the relation of bearing structures supporting polygon mirrors 1602a respectively included in the laser units 1602. With respect to the installation positioning plate of the laser units, therefore, the scan lines are not in the same position (height).

Furthermore, even in the case where the laser units are arranged so as to become parallel to each other, the laser beam emitting faces of respective laser units need to be inclined uniformly by an angle of approximately 5 degrees with respect to the surface of the photosensitive material belt in order to prevent laser beams reflected by the surface of the photosensitive material from returning to the laser units. Also because of necessity of providing this inclination, it becomes difficult to keep the positioning precision.

Due to these facts, it is necessary to be able to detect where the scan line actually scanned on the photosensitive material passes through. Heretofore, however, there has not been a sensor capable of detecting the scanning position of laser beam which is scanning at high speed. Therefore, there has been used a technique of forming a test pattern for detecting a position deviation value of the scan line on the photosensitive material, transferring the test pattern on paper, reading the position deviation value of the scan line from an image obtained on the paper, and adjusting the positions of the laser units.

In the case where the above described technique is used as the method for detecting the mounting states of the laser units, all image forming processes must be incorporated in the near perfect state. It is necessary to derive the position deviation value occurring at this time, as a numerical value, from the image transferred onto paper. Furthermore, since the contrast of the color Y is low, it is difficult to automate reading the position deviation value of the scan line for each color by taking the color Y as the reference. It is necessary for a person to judge the line center of the drawn test pattern by watching and read the distance between the centers as a numerical value of the position deviation value. A great deal of labor is required for the position adjustment of each laser unit.

In Japanese Patent Application Laid-open No. 5-119572, a color image forming apparatus having a photo sensor separated from a laser unit is disclosed. The photo sensor is installed at one edge of a photosensitive belt and is used to sense a laser scanning beam at the one edge to produce a image write timing signal.

In Japanese Patent Application Laid-open No. 4-163515, a laser beam printer is provided with a light-receiving portion having a light-gathering lens for gathering an incident laser beam to produce a beam spot on a photo sensor for a predetermined time period. The output of the photo sensor is used to obtain a image write timing.

However, these devices disclosed in Japanese Patent Application Laid-open Nos. 5-119572 and 4-163515 are directed to detection of the write timing when forming an image. Therefore, they cannot provide detection of the scanning position of a laser beam for adjustment of installation position of a laser unit.

SUMMARY OF THE INVENTION

In view of the foregoing description, an object of the present invention is to provide a laser scanning position detecting device which allows detection of the scanning position of a laser beam scanning at high speed.

Another object of the present invention is to provide a laser scanning position detecting apparatus which allows a laser unit to accurately place at a predetermined position.

Still another object of the present invention is to provide a laser scanning position detecting device which allows detection of the incidence timing and the scanning position of a laser beam scanning at high speed.

According to the present invention, a device for detecting a scanning position of a laser beam is used for a laser unit which scans a photosensitive material member with the laser beam to form an electrostatic latent image thereon. The device includes a position detector for detecting the scanning position of the laser beam from a beam spot of the laser beam formed thereon when the laser beam passes through the device and an optical system for directing the laser beam to a predetermined point of the position detector to form the beam spot for a predetermined time period during which the laser beam is scanning the device.

The device may further include a timing detector for detecting timing of incidence of the laser beam to the device. The optical system preferably comprises a lens having a first option and a second portion, wherein the first portion instantaneously directs the laser beam to the timing detector and the second portion directs the laser beam to the predetermined point of the position detector.

The optical system may include a slit through which the laser beam travels to the timing detector. The optical system may include a first lens for instantaneously passing the laser beam to the timing detector and a second lens for directing the laser beam to the predetermined point of the position detector. The optical system may include a slit through which the laser beam instantaneously travels to the timing detector and a lens for directing the laser beam to the predetermined point of the position detector.

The optical system may direct the laser beam to the predetermined point of the position detector such that the laser beam directed is incident to a light-receiving surface of the position detector in a direction approximately perpendicular to the light-receiving surface.

As described above, according to the present invention, the laser beam is directed onto the predetermined point of the position detector while scanning the optical system. Such a state that the laser beam is incident to the position detector as if to be quiescent thereon is made for the predetermined time period. Therefore, a stable output of the device can be obtained, ensuring the precise detection of a scanning position of the laser beam scanning at high speed.

Further, since the timing of incident laser beam can be detected by the timing detector, it is possible to sample and hold an output signal of the position detector at the time when the output signal become stable. Furthermore, since the optical system instantaneously directs the laser beam to the timing detector, the incident timing of the laser beam can be detected sharply.

According to another aspect of the present invention, a scanning position detecting apparatus comprises a first sensor provided at a scanning start location of the laser beam emitted from the laser unit and a second sensor provided at a scanning end location of the laser beam emitted from the laser unit. The first sensor includes a first position detector for detecting a first scanning position of the laser beam from a beam spot of the laser beam formed thereon when the laser beam passes through the first sensor, and a first optical system for directing the laser beam to a predetermined point of the first position detector to form the beam spot for a predetermined time period during which the laser beam is scanning the first sensor. The second sensor includes a second position detector for detecting a second scanning position of the laser beam from a beam spot of the laser beam formed thereon when the laser beam passes through the second sensor, and a second optical system for directing the laser beam to a predetermined point of the second position detector to form the beam spot for a predetermined time period during which the laser beam is scanning the second sensor.

Since the respective outputs of the first and second sensors located at both ends of the scan range are used to detect a change of laser beam scanning position, the scanning position can be more precisely detected.

DESCRIPTION OF THE PREFERRED EMBODIMENTS

Figure 3:
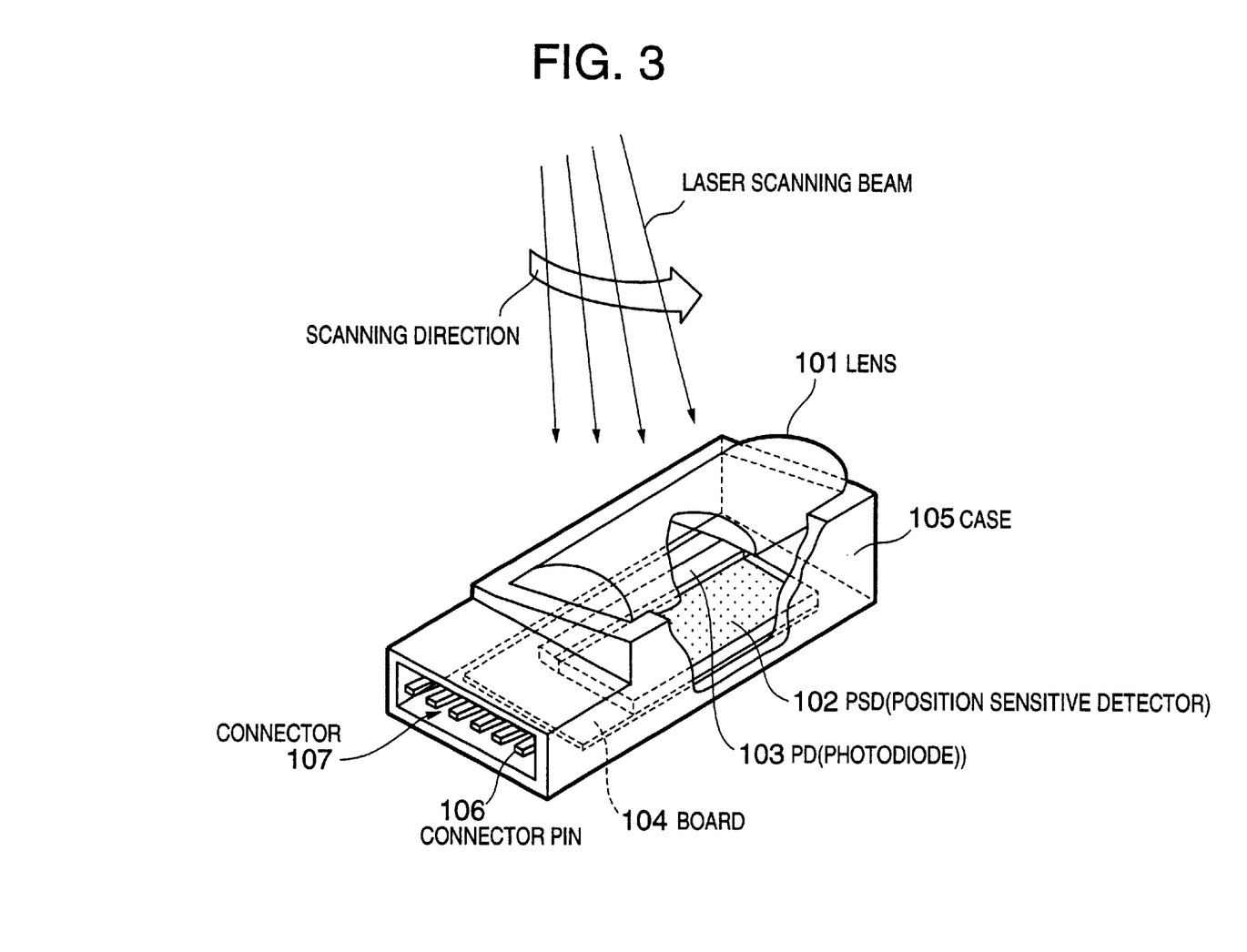
FIG. 3 is an perspective view showing an embodiment of a laser scanning position detecting sensor according to the present invention with a part broken away.

With reference to FIG. 3, a laser scanning position detecting sensor according to an embodiment of the present invention includes a lens 101 which is uniform in a direction perpendicular to the laser beam scanning direction, a PSD (position sensitive detector) 102 serving as an irradiation position detecting device on which a part of laser scanning beam transmitted through the lens 101 is incident, and a PD (photodiode) 103 serving as a beam receiving device.

The lens 101 is optically designed so as to make a laser scanning beam instantaneously incident on the PD 103 when the laser scanning beam is incident on a start point 101a (FIG. 4) of the lens 101, and thereafter focus the laser scanning beam on one point of the PSD 102 for a certain predetermined scanning time period. Furthermore, in order to ensure the position precision of the lens 101, the PSD 102, and the PD 103, the lens 101 is fixed to a case 105 and the PSD 102 and the PSD 103 are mounted on a board 104 housed and placed at a predetermined position in the case 105. Furthermore, in the laser scanning position detecting sensor, a connector 107 (FIG. 3) composed of connector pins 106 for connection to a controller (not illustrated) is provided.

Figure 4:
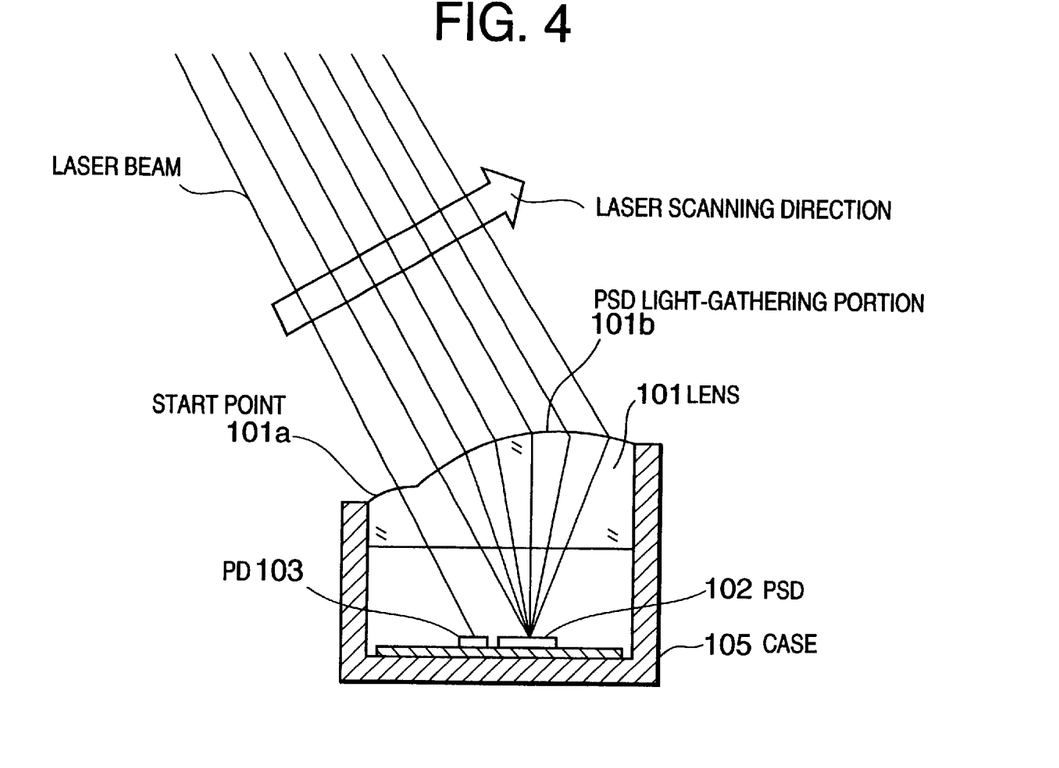
FIG. 4 is a sectional view obtained by cutting the laser scanning position detecting sensor shown in FIG. 3 along the laser scanning direction.

With reference to FIG. 4, when a scanning laser beam is incident on the start point 101a of the lens 101, the laser beam is first applied onto the PD 103 through the lens 101. The start point 101a of the lens 101 is optically designed so as to instantaneously pass the laser beam through the PD 103. Just after the laser beam is incident on the lens 101, the laser beam is applied to the PSD 102.

Furthermore, the lens 101 is optically designed so as to have a two stage configuration composed of a portion (start point 101a) for instantaneously passing laser beam through the PD 103 and a PSD light-gathering point 101b for focusing the incident laser beam onto a single point of the PSD 102 for a predetermined scanning time. In this example, the laser beam is incident to the lens 101 at a certain angle. When the laser beam scans the start point 101a. It is incident to the PD 103 through the start point portion of the lens 101. When scanning the PSD light-gathering portion 101b, the laser beam is directed by the PSD light-gathering portion 101b onto a position located above the midpoint area of the PSD 102 in the approximately direction perpendicular to the surface of the PSD 102 while scanning the PSD light gathering portion 101b. Such a state that the laser beam is incident to the PSD 102 as if to be quiescent on the PSD 102 is made for a certain fixed time period. Energy large enough for the PSD 102 to detect the position of the laser beam is supplied to the PSD 102.

Figure 5:
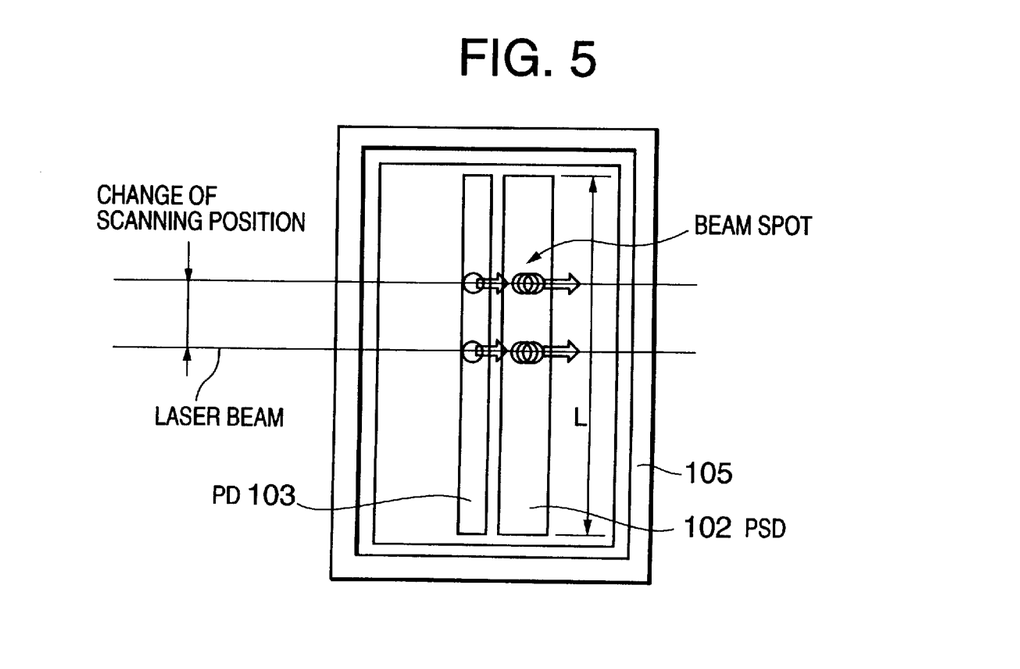
FIG. 5 is a top view of the laser scanning position detecting sensor shown in FIG. 4.

As shown in FIG. 5, the laser beam instantaneously pass through the PD 103. When the laser beam passes through the PSD 102, a beam spot is quiescent near the center of the PSD 102 in the width direction only for a certain fixed time.

Figure 6A:
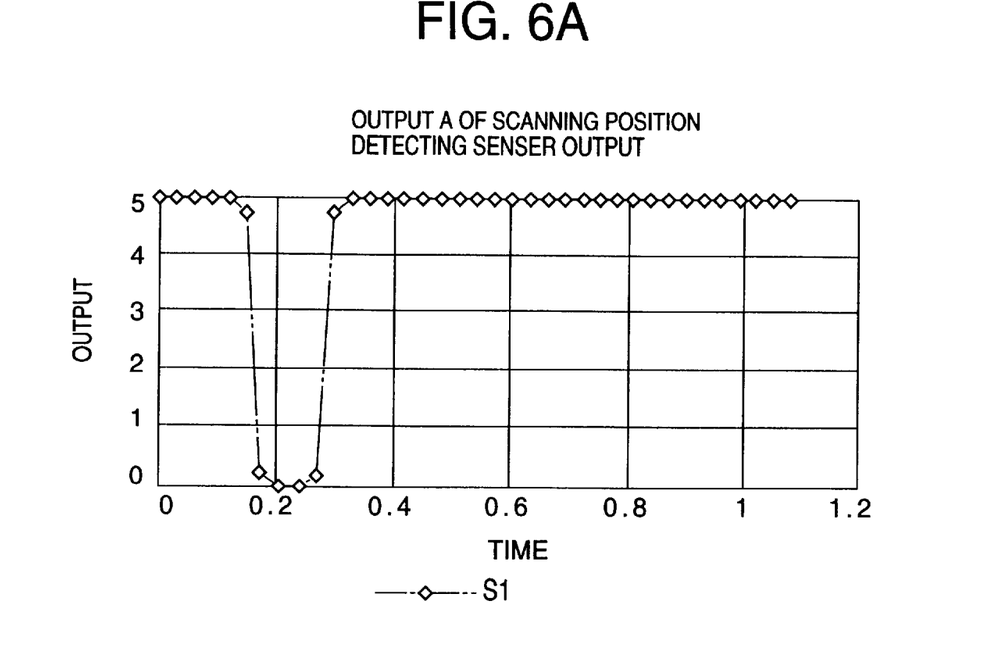
FIGS. 6A and 6B are graphs showing output characteristics of the scanning position detecting sensor shown in FIG. 3.
Figure 6B:
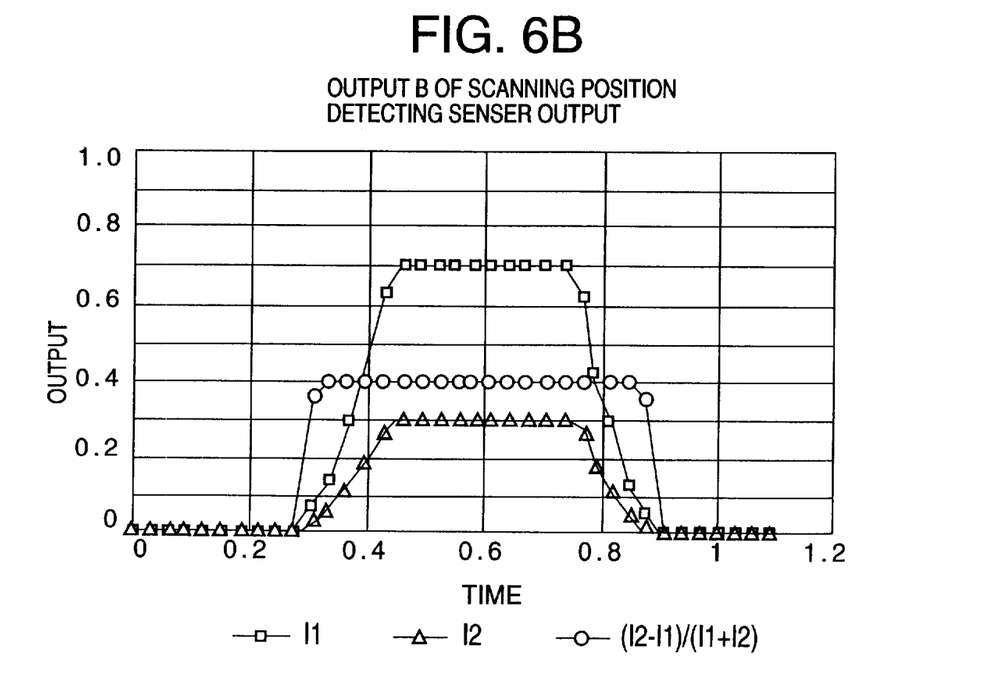

FIGS. 6A and 6B are graphs showing output characteristics of the scanning position detecting sensor shown in FIG. 3. FIG. 6A is a graph showing an output A obtained by the PD (photodiode), and FIG. 6B is a graph showing an output B obtained by the PSD (position sensing device).

These outputs A and B are obtained by a signal processor (not shown) which is composed of operational amplifiers and comparators provided on the board 104, forming the laser scanning position detecting sensor as shown in FIG. 3.

The signal processor which is not illustrated is adapted to perform a predetermined operation depending on a photo current flowing due to the laser beam incident to the PD 103. A "falling edge" of the output A which is produced when the output A falls from its high level to its low level can be used as the image forming timing by a controller (not illustrated).

The output B is obtained from such a characteristic of a well-known line PSD device of length L that two currents I1 and I2 are obtained depending on the scanning position x of a beam spot according to the following relation:

$(I2-I1)/(I1+I2)=2 \cdot x/L$.

The output B is produced by an operational amplifier circuit as a voltage which changes depending on the scanning position x of a beam spot.

Furthermore, the operational amplifier circuit includes a hold circuit for holding a voltage in a stable portion located nearly in the middle of the output B shown in FIG. 6B. In the controller, the output B is adapted to be obtained as a continuous direct current voltage which changes depending on the scanning position.

The outputs A and B are outputted by the signal processor and the operational amplifier circuit as waveforms shown in FIGS. 6A and 6B in synchronism with the scanning of a laser beam. Out of these outputs, the voltage amplitude of the output B corresponds to the laser scanning position as shown in FIG. 5. By sample-holding the output B by using a hold timing signal produced from a leading edge of the output B, therefore, a continuous direct current voltage is formed and the laser scanning position is obtained.

By the way, the above described signal processor composed of operational amplifiers and comparators is well known by those skilled in the art, and it is not an essential component of the present invention. Accordingly, description of its detailed configuration will be omitted. Furthermore, as for an alignment structure for arranging the PSD and the PD forming the scanning position detecting sensor of the present invention with high mutual precision, and an alignment structure for mounting the PSD and the PD on the board accurately and mounting them in a case with high precision, they are well known by those skilled in the art and they are not essential components of the present invention. Accordingly, their detailed description will be omitted.

The output signals obtained by the laser scanning position detecting sensor of the present embodiment are processed as described above. The processed output signals are supplied to an A/D converter of a microcomputer as a direct current voltage corresponding to the laser scanning position. As a result, the laser scanning position of each laser unit can be judged easily. When the laser scanning position detecting sensor of the present embodiment are disposed in two locations, i.e., in the scanning start position and the scanning end position of each laser unit, therefore, the actual scanning position of a laser beam can be obtained accurately from an output voltage difference produced between these two sensors depending on a deviation of the laser scanning position.

Figure 7:
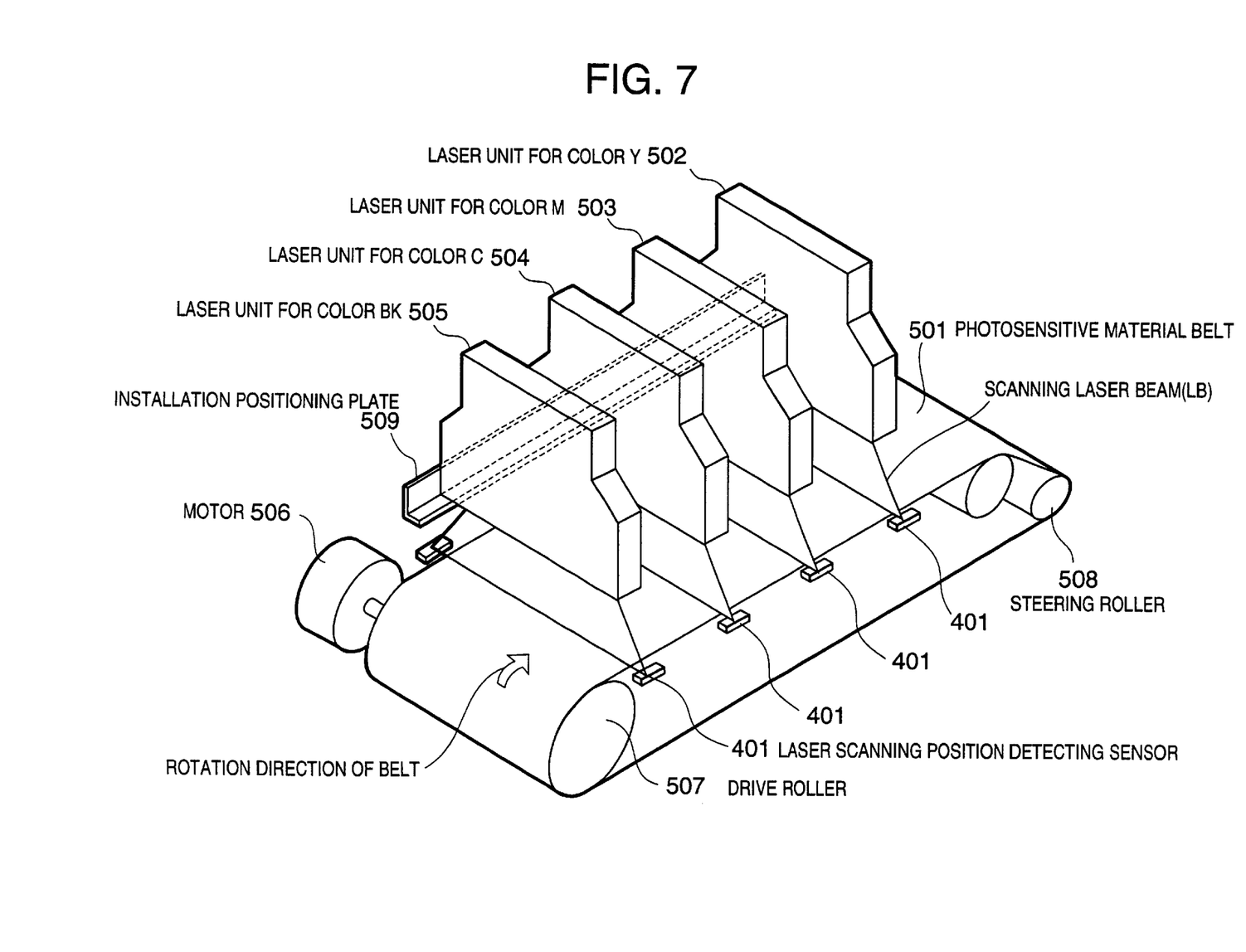
FIG. 7 is a schematic configuration diagram showing a four-color tandem color laser printer having laser scanning position detecting sensors shown in FIG. 3.

FIG. 7 is a schematic configuration diagram showing a four-color tandem-type color laser printer having the laser scanning position detecting sensors (as shown in FIG. 3) mounted thereon. Structures of a photosensitive material belt 501, laser units 502, 503, 504 and 505, a motor 506, a drive roller 507, a steering roller 508, and an L-shaped installation positioning plate 509 of the printer as shown in FIG. 7 are the same as equivalents of the conventional printer shown in FIG. 1. Accordingly, detailed description thereof will be omitted.

As described above, the laser scanning position detecting sensors 401 according to the present embodiment are disposed in the printer such that a voltage varying depending on each beam scanning position may be obtained at the scanning start position and the scanning end position of the laser beam emitted from each laser unit. In the case where a laser unit is mounted on the printer in such a state as to be deviated from a predetermined position, therefore, a voltage difference between the two laser scanning position detecting sensors generated depending on the deviation value is obtained by a microcomputer (not shown) which is processing these signals. On the basis of this voltage difference, the mounting position error of the laser unit is recognized.

A program running on the above-described microcomputer is designed to calculate such a voltage difference as an actual laser mounting position deviation value when the printer is operating in a "laser unit mounting state adjustment mode." By conducting automatic adjustment using an actuator such as a motor while monitoring the outputs of the two laser scanning position detecting sensors, therefore, the mounting state of each laser unit can be adjusted.

Furthermore, the position relation between laser units is adjusted by taking the laser unit 502 for the color Y as a reference. As a result, a color shift occurring in the sub-scanning direction (belt rotation direction) simply becomes an error of the mounting spacing between the respective laser units. Each of the laser scanning position detecting sensors 401 is disposed in a predetermined position in the printer. Therefore, the color shift caused as described above can be completely corrected by control of image timing at the time of image writing. Even when there is an error in the mounting spacing between respective laser units, a color shift is prevented from occurring in the sub-scanning direction.

Correction of a color shift which might occur in the main scanning direction (laser beam scanning direction) will be described hereinafter.

Even when the laser units are mounted on the printer so as to be in contact with the installation positioning plate 509 as shown in FIG. 7, there occurs an error of several tens $\mu$m between an SOS sensor (not illustrated) in each laser unit and a predetermined laser unit mounting position.

In the laser scanning position detecting sensor according to the present embodiment, the scanning start position is derived from the output of the SOS sensor included in the laser unit and the above described output A of the laser scanning position detecting sensor of the present embodiment mounted at the scanning start position, which uses the output of the photodiode for providing the image forming timing. Furthermore, the swing width of the laser beam can be known from a time difference between the respective outputs A of a pair of laser scanning position detecting sensors located at the scanning start position and the scanning end position. From this relation, it becomes possible to automatically control the adjustment of the scanning start position, adjustment of the image forming width, and adjustment of image forming dot clock. As a result, a color shift is also prevented from occurring in the main scanning direction.

In the present embodiment, a laser beam is thus focused on the same point of the PSD 102 for a certain scanning time period by the light-gathering portion 101*b* of the lens 101. Even if the case where the laser scanning speed is high, therefore, such a time that the laser beam spot comes in a quiescent state on the PSD 102 occurs. In a stable state, therefore, the output signal of the PSD 102 can be taken in as a signal of the laser scanning position. Furthermore, since the PD 103 is provided, the hold operation at such a point that the output signal of the PSD 102 becomes stable is possible. The laser scanning position can be recognized from a change of direct current output voltage.

Furthermore, the output of the PD 103 at the scanning start position is used to obtain a time difference from the SOS sensor provided in each laser unit. By counting this time difference by the controller (not illustrated), the position deviation value of the laser unit in the main scanning direction can be obtained. In the present embodiment, two mounting states of the laser unit with respect to the laser scanning position deviation and the position deviation in the main scanning direction can be detected as an electric signal.

As described above, the laser scanning position detecting sensor of the present embodiment detects the mounting state of each laser unit. By processing the electric signals obtained by the controller, therefore, the deviation of the parallel state between laser units can be adjusted by using a position adjustment mechanism (not illustrated) disposed on a side of each laser unit opposite to the installation positioning plate 509 side. Furthermore, as for a deviation in the main scanning direction, an image deviation in the main scanning direction can be automatically corrected by conducting a correction so as to change the number of clock pulses counting until the scanning start position and the preset dot clock for image dot pitch (feed pitch in the main scanning direction of image forming).

The above-described laser scanning position detecting sensor is such an example that the lens 101 is optically designed to pass a laser beam through the PD 103 and the PSD 102 arranged horizontally. However, the lens design and the arrangement of the PD and the PSD are not restricted to the above described configuration at all. Even when the PD and the PSD are mounted in the case so as to be inclined from the horizontal direction and so as to make a laser beam incident on the surface of the PD and PSD vertically, no problem is posed at all. Furthermore, in the case where the PD and the PSD are mounted in the case so as to be inclined from the horizontal direction, the lens design is facilitated. However, the mounting of the PD and the PSD depends on the configuration of the case included in the present laser scanning detection sensor.

In the foregoing description, such an example that the lens focuses the laser beam for both the PD and the PSD has been shown. Alternatively, it is also possible that the laser beam is directly incident on the PD without intervention of the lens and the laser beam is focused only on the PSD by the lens.

Furthermore, in order to raise the time precision of laser beam incident on the PD, a laser beam transmission slit may be provided in the optical path of a laser beam incident on the PD. By this transmission slit, an edge capable of conducting more accurate time detection is formed.

Furthermore, in the foregoing description, such an example that the PD and the PSD are mounted on the board as different devices has been shown. Since both the PD and the PSD can be formed on the same semiconductor substrate, such a configuration that the PD and the PSD are integrated in one may be adopted.

Furthermore, in the foregoing description, such an example that the signal processor composed of operational amplifiers and comparators is formed on the board on which the PD and the PSD are mounted has been shown. However, such a restriction that the signal processor must be provided on the board in the laser scanning position detecting sensor is not especially imposed. It is evident that the above-described effects can be obtained without any change even when the signal processor is provided on a side (such as a control board of the laser printer) utilizing the laser scanning position detecting sensor.

As described above, the scanning position detecting sensor of the present invention includes an irradiation position sensing device for detecting the scanning position of a laser beam which scans the laser scanning position detecting sensor, and a lens adapted to gather the laser beam onto one point of the irradiation position sensing device for a predetermined time period when the laser scanning position detecting sensor is scanned by the laser beam. Even in the case of high speed scanning with the laser beam, therefore, the scanning position of the laser beam can be detected accurately.

What is claimed is:

1. A device for detecting a scanning position of a laser beam in a direction perpendicular to a main scanning direction of the laser beam, the laser beam scanning a photosensitive material member to form an electrostatic latent image thereon, the device comprising:

a position detector for detecting the scanning position of the laser beam along the direction perpendicular to the scanning direction of the laser beam from a beam spot of the laser beam formed on the detector when the laser beam passes over the device; and an optical system for converging the laser beam to a single point on the position detector in the main scanning direction of the laser beam as the laser beam scans the device in the main scanning direction.

2. The device according to claim 1, further comprising:
a timing detector for detecting timing of incidence of the laser beam to the device.

3. The device according to claim 2, wherein the optical system comprises a lens having a first portion and a second portion, wherein the first portion instantaneously directs the laser beam to the timing detector and the second portion directs the laser beam to the predetermined point of the position detector.

4. The device according to claim 2, wherein the optical system comprises a slit through which the laser beam travels to the timing detector.

5. The device according to claim 2, wherein the optical system comprises:
a first lens for instantaneously passing the laser beam to the timing detector; and
a second lens for directing the laser beam to the predetermined point of the position detector.

6. The device according to claim 2, wherein the optical system comprises:
a slit through which the laser beam instantaneously travels to the timing detector; and
a lens for directing the laser beam to the predetermined point of the position detector.

7. The device according to claim 1, wherein the optical system directs the laser beam to the predetermined point of the position detector such that the laser beam directed is incident to a light-receiving surface of the position detector in a direction approximately perpendicular to the light-receiving surface.

8. A scanning position detecting apparatus for detecting a scanning position of a laser beam in a direction perpendicular to a main scanning direction of the laser beam, the laser beam scanning a photosensitive material member to form an electrostatic latent image thereon, the device comprising:
a first sensor provided at a scanning start location of the laser beam emitted from the laser unit, comprising:
a first position detector for detecting a first scanning position of the laser beam along the direction perpendicular to the scanning direction of the laser beam from a beam spot of the laser beam formed on the detector when the laser beam passes over the first sensor; and
a first optical system for converging the laser beam to a single point on the first position detector in the main scanning direction of the laser beam as the laser beam scans the first sensor in the main scanning direction; and
a second sensor provided at a scanning end location of the laser beam emitted from the laser unit, comprising:
a second position detector for detecting a second scanning position of the laser beam along the direction perpendicular to the scanning direction of the laser beam from a beam spot of the laser beam formed on the detector when the laser beam passes over the second sensor; and
a second optical system for converging the laser beam to a single point on the second position detector in the main scanning direction of the laser beam as the laser beam scans the second sensor in the main scanning direction.

9. The scanning position detecting apparatus according to claim 8, wherein the first sensor further comprises a first timing detector for detecting timing of incidence of the laser beam to the first sensor; and
the second sensor further comprises a second timing detector for detecting timing of incidence of the laser beam to the second sensor.

10. The scanning position detecting apparatus according to claim 9, wherein
the first optical system comprises a first lens having a first portion and a second portion, wherein the first portion instantaneously directs the laser beam to the first timing detector and the second portion directs the laser beam to the predetermined point of the first position detector; and
the second optical system comprises a second lens having a third portion and a fourth portion, wherein the third portion instantaneously directs the laser beam to the second timing detector and the fourth portion directs the laser beam to the predetermined point of the second position detector.

11. An image forming apparatus comprising:
at least one laser unit for scanning a photosensitive material member with a laser beam to form an electrostatic latent image thereon; and
a device for detecting a scanning position of a laser beam in a direction perpendicular to a main scanning direction of the laser beam, the laser beam scanning a photosensitive material member to form an electrostatic latent image thereon, the device comprising:
a first sensor provided at a scanning start location of the laser beam emitted from each of the at least one laser unit, comprising:
a first position detector for detecting a first scanning position of the laser beam along the direction perpendicular to the scanning direction of the laser beam from a beam spot of the laser beam formed on the detector when the laser beam passes over the first sensor; and
a first optical system for converging the laser beam to a single point on the first position detector in the main scanning direction of the laser beam as the laser beam scans the first sensor in the main scanning direction; and
a second sensor provided at a scanning end location of the laser beam emitted from the laser unit, comprising:
a second position detector for detecting a second scanning position of the laser beam along the direction perpendicular to the scanning direction of the laser beam from a beam spot of the laser beam formed on the detector when the laser beam passes over the second sensor; and
a second optical system for converging the laser beam to a single point on the second position detector in the main scanning direction of the laser beam as the laser beam scans the second sensor in the main scanning direction.

12. The image forming apparatus according to claim 11, further comprising:
an installation positioning plate for positioning the laser unit; and
a position adjustment mechanism for adjusting a position of each of the at least one laser unit based on detection results of the first sensor and the second sensor.

* * * * *

UNITED STATES PATENT AND TRADEMARK OFFICE
CERTIFICATE OF CORRECTION

PATENT NO. : 6,512,585 B1
DATED : January 28, 2003
INVENTOR(S) : Teruyuki Ikeda

It is certified that error appears in the above-identified patent and that said Letters Patent is hereby corrected as shown below:

<u>Title page,</u>
Item [73], Assignee, please delete "Murata Manufacturing Co. Ltd.", and insert
-- NEC Corporation, Tokyo, Japan --.

Signed and Sealed this

Thirteenth Day of May, 2003

JAMES E. ROGAN
*Director of the United States Patent and Trademark Office*